United States Patent [19]
Teng et al.

[11] Patent Number: 5,649,062
[45] Date of Patent: Jul. 15, 1997

[54] AUTO-TUNING CONTROLLER AND METHOD OF USE THEREFOR

[75] Inventors: Dan Teng, Wheeling; Shay-Ping T. Wang, Long Grove, both of Ill.

[73] Assignee: Motorola, Inc., Schaumburg, Ill.

[21] Appl. No.: 268,395

[22] Filed: Jun. 30, 1994

[51] Int. Cl.⁶ .................................................. G06F 15/18
[52] U.S. Cl. .............................. 395/22; 395/23; 395/903
[58] Field of Search ................................ 395/22, 23, 903

[56] References Cited

U.S. PATENT DOCUMENTS

| | | | |
|---|---|---|---|
| 5,041,916 | 8/1991 | Yoshida et al. | 358/433 |
| 5,175,797 | 12/1992 | Funabashi et al. | 395/11 |
| 5,255,344 | 10/1993 | Takagi et al. | 395/22 |
| 5,402,520 | 3/1995 | Schnitta | 395/22 |
| 5,408,588 | 4/1995 | Ulug | 395/23 |
| 5,450,527 | 9/1995 | Wang | 395/22 |
| 5,450,890 | 9/1995 | Wang | 395/22 |

OTHER PUBLICATIONS

Bruce E. Stuckman and Norman W. Laursen, "A Method of Control System Design Using Global Search", IEEE Transactions on Automatic Control, vol. 34, No. 1, Jan. 1989.

P.L. Stuckman and B.E. Stuckman, "Iterative Global Design of P.I.D. Controllers for Systems Without Models", Iasted International Symposium on Simulation & Modelling, Lugano, Switzerland, Jun. 1989.

B.E. Stuckman, M.C. Care and P.L. Stuckman, "System Optimization Using Experimental Evaluation of Design Performance", Eng. Opt., 1990, vol. 16, pp. 275–290.

Ahmad et al, "Error Back–propagation Learning Using Polynomial Energy Function", IEEE Inter. Conf. on Systems Engineering, 1992.

Manry et al, "Output Weight Optimization for Multi–layer Perceptron", 26th Asilomar Conf. on Signals, Systems & Computers, 1992.

Chang et al, "Polynomial and Standard Higher Order Neural Network", IEEE Inter. Conf. on Neural Networks, 1993.

Specht et al, "Probabilistic Neural Networks and the Polynomial Adaline as Complementary Techniques for Classification", IEEE Trans. on Neural Networks, vol. 1, No. 1, Mar. 1990.

Hoffmann et al, "A Neural Feed–Forward Network With a Polynomial Nonlinearity", Proceedings of the IEEE–sp Workshop, 31 Aug.–2Sep. 1992.

Rohani et al, "A Mapping Approach for Designing Neural Sub–Nets", Neural Network for Signal Processing, issued 1991.

Primary Examiner—George B. Davis
Attorney, Agent, or Firm—Bruce E. Stuckman; Jeffrey G. Toler; Michael K. Lindsey

[57] ABSTRACT

In an auto-tuning controller the initial values of control coefficients are found by fitting a control polynomial to control transfer characteristic data. The values are then tuned using a descent-based optimization method.

33 Claims, 9 Drawing Sheets

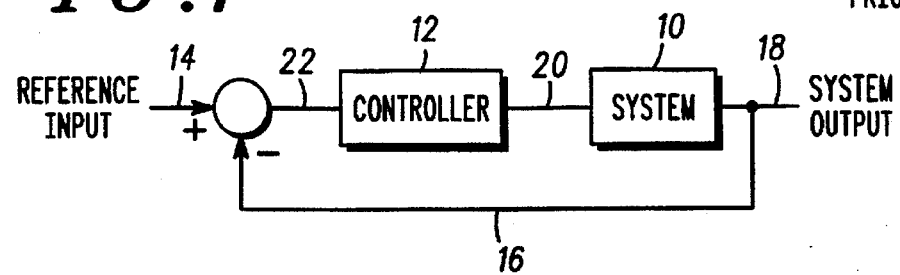
FIG.1 —PRIOR ART—
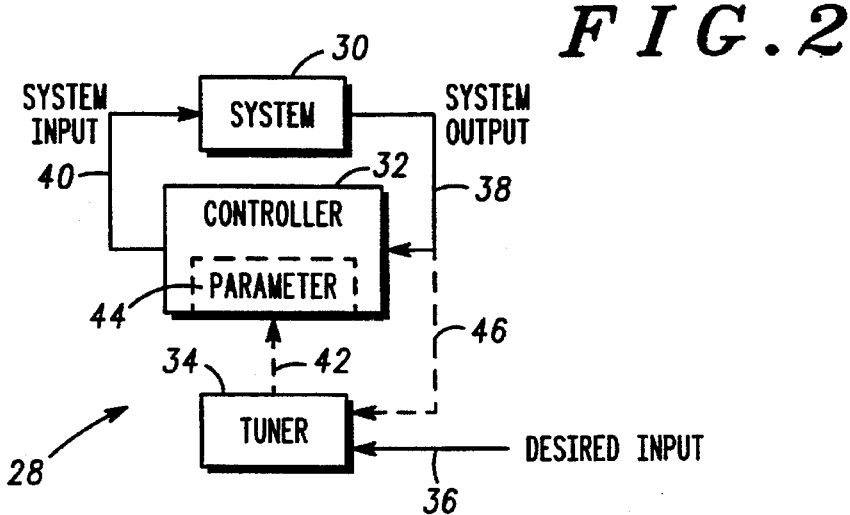
FIG.2
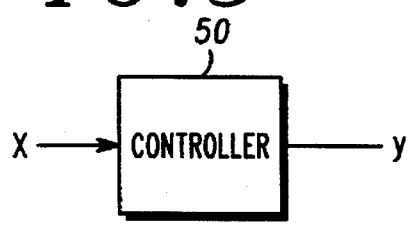
FIG.3
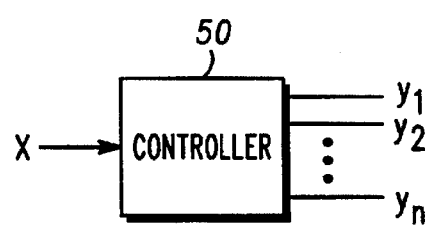
FIG.4
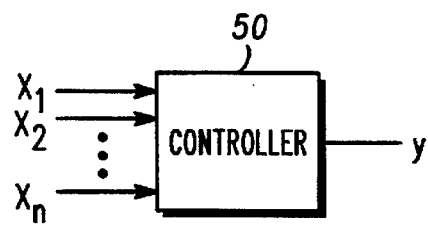
FIG.5
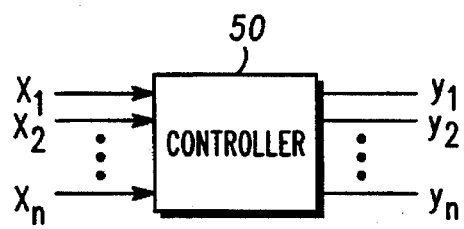
FIG.6

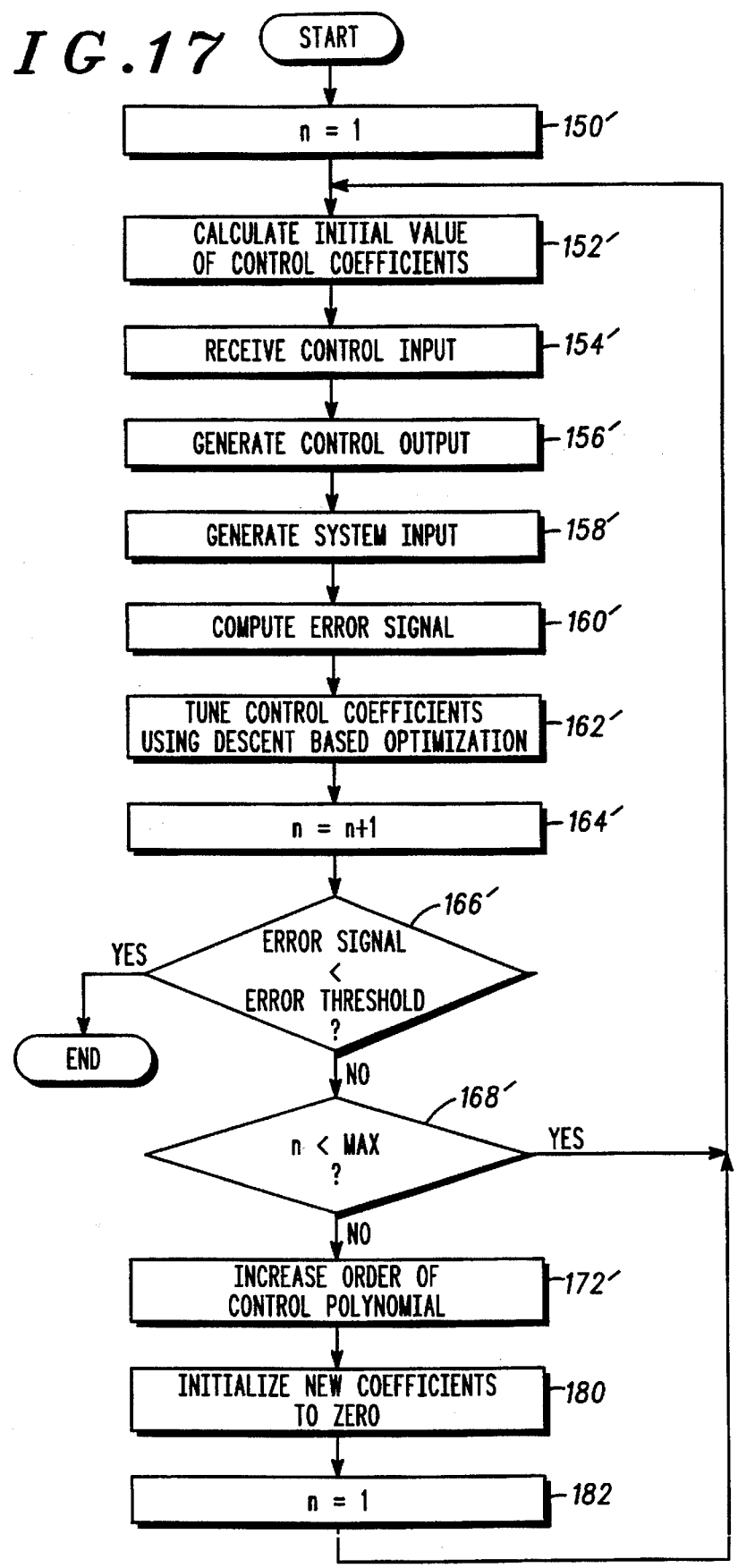

AUTO-TUNING CONTROLLER AND METHOD OF USE THEREFOR

RELATED INVENTION

The present invention is related to the following pending application which is assigned to the same assignee as the present invention:

"Neural Network and Method of Using Same" having application Ser. No. 08/076,601 filed on Jun. 14, 1993.

The subject matter of the above identified related application is hereby incorporated by reference into the disclosure of this invention.

FIELD OF THE INVENTION

This invention relates generally to automatic control systems and, in particular, to control systems which are capable of automatically tuning their parameters to optimized performance.

BACKGROUND OF THE INVENTION

Control systems are widely used today for machines, devices and industrial and economic processes. A configuration for a general control system is shown in FIG. 1. The system to be controlled (10) is connected in a feedback configuration with controller (12) which attempts to drive the system output (18) to the value of reference input (14). System output (18) is fed back via feedback path (16) where it is subtracted from reference input (14) to form an error signal (22). This error signal (22) is processed by controller (12) to generate a control output (20) which is in turn fed to the input of system (10). While there are a whole host of different control configurations and structures in use today, one with ordinary skill-in-the-art will realize that FIG. 1 represents the basic building block for these controllers.

The example of a particular controller implementation is a so-called PID or proportional, integral and derivative controller. This controller is so named since its control output is derived from a weighted sum of the input, the integral of the input, and the derivative of the input. This control strategy is widely used in industry possibly due to the fact that it is available as an off-the-shelf unit. However, the PID controller suffers from two major disadvantages: 1. It is difficult to determine (or tune) the control coefficients of a controller for a particular application; and 2. The simplicity of the control law makes this controller unsuitable for highly complex, high-order or highly nonlinear systems.

One method for tuning the parameters of a PID controller was developed by Ziegler and Nichols. The Ziegler/Nichols method, as known to those skilled in the art, is intended for manual tuning of the control parameters, and thus requires intervention by a skilled operator. A second method of tuning a PID controller was presented by Stuckman et al. in "System Optimization Using Experimental Evaluation of Design Performance", *Engineering Optimization* Vol. 16, 1990, pp. 275-289, and "Iterative Global Design of PID Controllers for Systems Without Models", *Proceedings Of the 17th IASTED International Symposium—Simulation and Modelling*, June 1989, pp. 320-321. This method, while operating automatically, uses a complicated Bayesian global optimization methodology which requires extraordinary amounts of computation to converge upon a set of control parameters. Further, this auto-tuning controller is limited by the fundamental limitations of the underlying PID control structure and again is not suitable for many highly complex or nonlinear systems.

An additional class of control implementation is the so-called self-tuning adaptive controller. In this strategy, the system to be controlled is extensively modeled and the model is continuously updated mathematically based upon the performance of the system. While providing suitable performance for some applications, adaptive controllers require an extremely complicated control algorithm and extensive computation in their implementation. Further, a very accurate model of the system is required for the adaptive controller to effectively operate. The performance of the controller rapidly degrades when error between the model and the actual system is above nominal levels.

A further example of control implementation is the fuzzy logic controller. The fuzzy logic controller makes control decisions based upon a series of fuzzy logic rules which transform the control input into a control output via a nonlinear transfer characteristic. While the performance of the fuzzy logic controller is robust, in that it is capable of maintaining an adequate control even in the presence of substantial error between the system model and the actual system, the parameters of the fuzzy logic controller are difficult to tune given their nonintuitive relationship to the system output. Further, experience has shown that it is difficult to implement fuzzy logic controller designs for large and complicated systems.

Another class of control implementations is the polynomial controller. In the polynomial controller, the control output is a polynomial function of the control input. A method for tuning a polynomial controller was presented by Stuckman and Laursen, "A Method of Control System Design Using Global Search", *IEEE Transactions on Automatic Controls*, Vol. AC-34, No. 1, January 1989. This method uses a complicated Bayesian global optimization methodology which requires an extraordinary amount of computation. Further, this method is only operable for low-dimensional systems and has not been shown to function for polynomial controllers with more than ten terms. Therefore, there is a significant need for a controller which is relatively robust, in that it is capable for providing adequate control when significant error is present between the model and the actual system. Further, there is also a significant need for a control system in which the parameters can be tuned automatically. Further, a significant need exists for a controller design which is capable of handling high-dimensional, highly complex, and nonlinear systems. In addition, a significant need exists for a method of tuning the parameters of the controller which provides for a short product development cycle, in that the tuning can be performed in a relatively simple and efficient manner by one who is not necessarily a control expert.

SUMMARY OF THE INVENTION

It is thus one advantage of the present invention that the parameters of a control system can be tuned automatically.

A further advantage of the present invention is that a controller is provided which can operate on high-dimensional, highly complex or highly nonlinear systems.

An additional advantage of the present invention is the relatively simple and efficient manner in which the control parameters of a controller can be tuned.

In one embodiment of the present invention there is provided a method for tuning the control coefficients of a controller. Initial values of the control coefficients are calculated from control transfer characteristic data by fitting the polynomial function of the controller to control transfer characteristic data. An error signal is then derived based on the difference between the system output and the desired output. The values of the control coefficients are then tuned using a descent-based optimization method in order to minimize the output error signal.

In an additional embodiment of the present invention there is provided a method for controlling a system to a desired output. Initial values of the control coefficients are calculated from control transfer characteristic data by fitting the polynomial function of the controller to control transfer characteristic data. A control input is received and a control output is generated based upon a polynomial function of the control input. The system input is generated based upon the control output so as to drive the system output toward the desired output.

In a further embodiment of the present invention there is provided a controller for controlling a system to a desired output. This controller includes initial value calculating means for calculating initial values of the control coefficients from control transfer characteristic data by fitting the polynomial control function to control transfer characteristic data. Error computing means computes, over time, an output error signal based upon the difference between the system output and a desired output. Coefficient adjusting means in the controller are used to update the value of the control coefficients using a descent-based optimization method to minimize the output error signal.

BRIEF DESCRIPTION OF THE DRAWINGS

The invention is pointed out with particularity in the appended claims. However, other features in the invention will become more apparent and the invention will be best understood by referring to the following detailed description in conjunction with the accompanying drawings in which FIG. 1 shows a prior art control system.

FIG. 2 shows a block diagram representation of one embodiment of the present invention.

FIG. 3 shows a block diagram representation of the polynomial function controller used in conjunction with one embodiment of the present invention.

FIG. 4 shows a block diagram representation of a polynomial function controller used with another embodiment of the present invention.

FIG. 5 shows a block diagram representation of a polynomial function controller used in conjunction with an additional embodiment of the present invention.

FIG. 6 shows a block diagram representation of a polynomial function controller used in conjunction with a further embodiment of the present invention.

FIG. 17 shows an alternative embodiment of the method of the present invention.

DETAILED DESCRIPTION OF A PREFERRED EMBODIMENT

Figure 7:
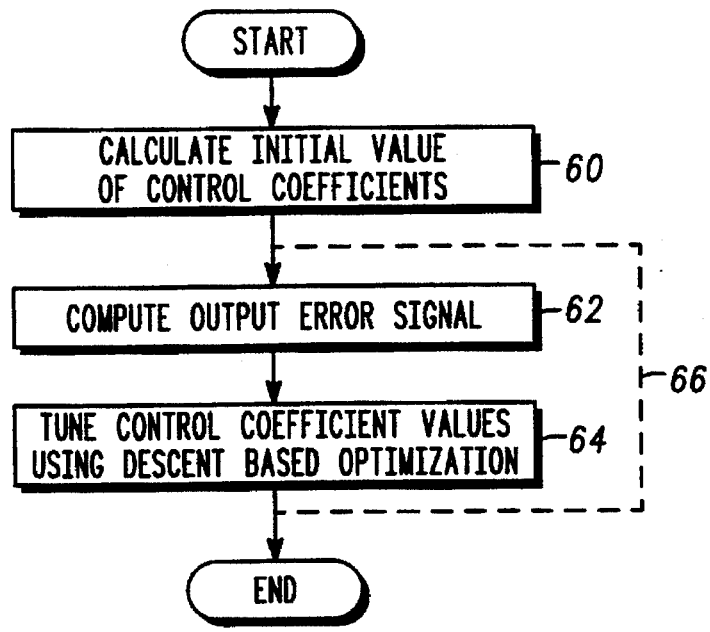
FIG. 7 shows a flow chart representation of one embodiment of the method of the present invention.

It will be understood by one of ordinary skill in the art that the controller and tuner of the present invention may be implemented in hardware or software or any combination thereof, and that the terms "control parameters" and "control coefficients" are used interchangeably in this description.

FIG. 2 shows a block diagram representation of one embodiment of the present invention. In FIG. 2 a tuner for use in cooperation with a control system is presented. The system to be controlled (30) has a system input (40) and a system output (38). Controller (32) has an output which drives system input (40). The input to controller (32) is represented as being derived from the system output (38); however, one with ordinary skill-in-the-art will recognize that the input to controller (32), in a general sense, could be derived from the system output, the desired output, one or more measured or estimated states of the system (30), or any combination thereof. One with ordinary skill-in-the-art will also recognize that the output of controller (32) need not directly feed to system input (40). Rather, the output of controller (32) need only affect system input (40) in some fashion.

Controller (32) operates based upon a series of control parameters (44), such that the variation of control parameters (44) in turn varies the input/output relationship of controller (32) and, hence, varies the characteristics of system output (38 The process of implementing a particular controller (32) for a given application thus includes the determination of the proper values for control parameters (44).

These control parameter values are selected, in one embodiment of the present invention, by tuner (28). Tuner (28) is detachably connected to controller (32) via line (42) so as to adjust parameters (44). Further, tuner (28) has access to system output (38) via line (46) and desired output (36).

In operation, tuner (28) of the present invention compares system output (38) to desired output (36) in order to determine the proper value for control parameters (44) of controller (32). Once the proper values for control parameters (44) have been determined, tuner (28) can be detached and controller (32) can be left to control the system (30) autonomously. While this detachable arrangement for tuner (28) is preferred, other arrangements are possible, such as where tuner (28) is permanently connected to controller (32) to continuously tune the control parameters (44) of controller (32) or to operate only over selected intervals of time to periodically update control parameters (44).

FIG. 3 shows a block diagram representation of the polynomial function controller (50) used in conjunction with one embodiment of the present invention. The output (Y) of polynomial function controller (50) in response to an input (X) is given by the following general equation:

$$y = w_o + w_1 x + w_2 x^2 +$$  Equation (1)

where $w_i$ represents the ith control coefficient. Thus the output of polynomial function controller (50) is expressed in terms of a plurality of control coefficients and a corresponding plurality of polynomial terms of arbitrary order. For instance, an arbitrary fourth order controller would be expressed as:

$$y = w_o + w_1 x + w_2 x^2 + w_3 x^3 + w_4 x^4$$  Equation (2)

It should be noted that the input to polynomial function controller (50) could be a vector quantity rather than the scalar quantity represented in FIG. 3 and further the output of function controller (50) could also be a vector quantity rather than the scalar quantity shown in FIG. 3. This yields the alternative structures for polynomial function controller (50) shown in FIGS. 4 through 6.

FIG. 4 shows a block diagram representation of a polynomial function controller used with another embodiment of the present invention. A controller (50) has a scalar input and a vector output comprising a plurality of individual scalar outputs $y_1$, $y_2$ and $y_n$.

FIG. 5 shows a block diagram representation of a polynomial function controller used in conjunction with an additional embodiment of the present invention. Controller (50) has a vector input comprising a plurality of scalar inputs $x_1$, $x_2$ and $x_n$ and a scalar output.

FIG. 6 shows a block diagram representation of a polynomial function controller used in conjunction with a further embodiment of the present invention. Controller (50) has a vector input $x_1$, $x_2$ and $x_n$ and a vector output $y1, y_2$ and $y_n$.

FIG. 7 shows a flow chart representation of one embodiment of the method of the present invention. First, regarding box (60), the initial value of each of the control coefficients is calculated by fitting the polynomial control function to control transfer characteristic data. Next, regarding box (62), an output error signal is computed based upon the difference between the system output and the desired output. Regarding box (64), the control coefficient values are tuned from their initial value using a descent-based optimization method. This optimization method is optionally an iterative approach which requires repeated computation of the output error signal in box (62) and repeated tuning of the control coefficient values in box (64) as presented by optional feedback path (66).

More particularly, the initial value of each of the control coefficients is calculated, in a preferred embodiment, based upon a plurality of control transfer characteristic data which characterizes the input/output relationship of the controller. This control transfer characteristic data could be derived from discrete samples of a continuous input/output control characteristic derived from any of a number of standard control methodologies. For instance, the system to be controlled could be modeled, and a proposed control input/output transfer characteristic could be developed based upon the development of a series of fuzzy logic rules which generate a fuzzy logic controller. Further, other conventional control techniques such as classical control, modern control, optimal control could be used to derive the desired input/output characteristic and thus the control transfer characteristic data required by the method used in a preferred embodiment.

Figure 8:
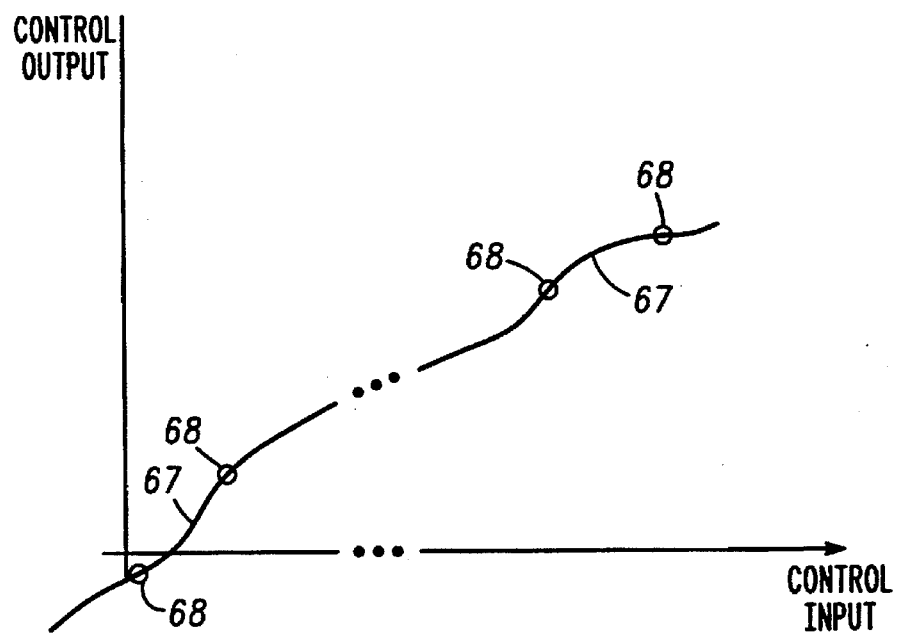
FIG. 8 shows sample control transfer characteristic data used to derive the initial control coefficient values in one embodiment of the present invention.

FIG. 8 shows sample control transfer characteristic data used to derive the initial control coefficient values in one embodiment of the present invention. This control transfer characteristic data (68) is used to derive the initial value of the control coefficients used in the present invention by calculating the best polynomial fit (67) to the data (68).

Figure 9:
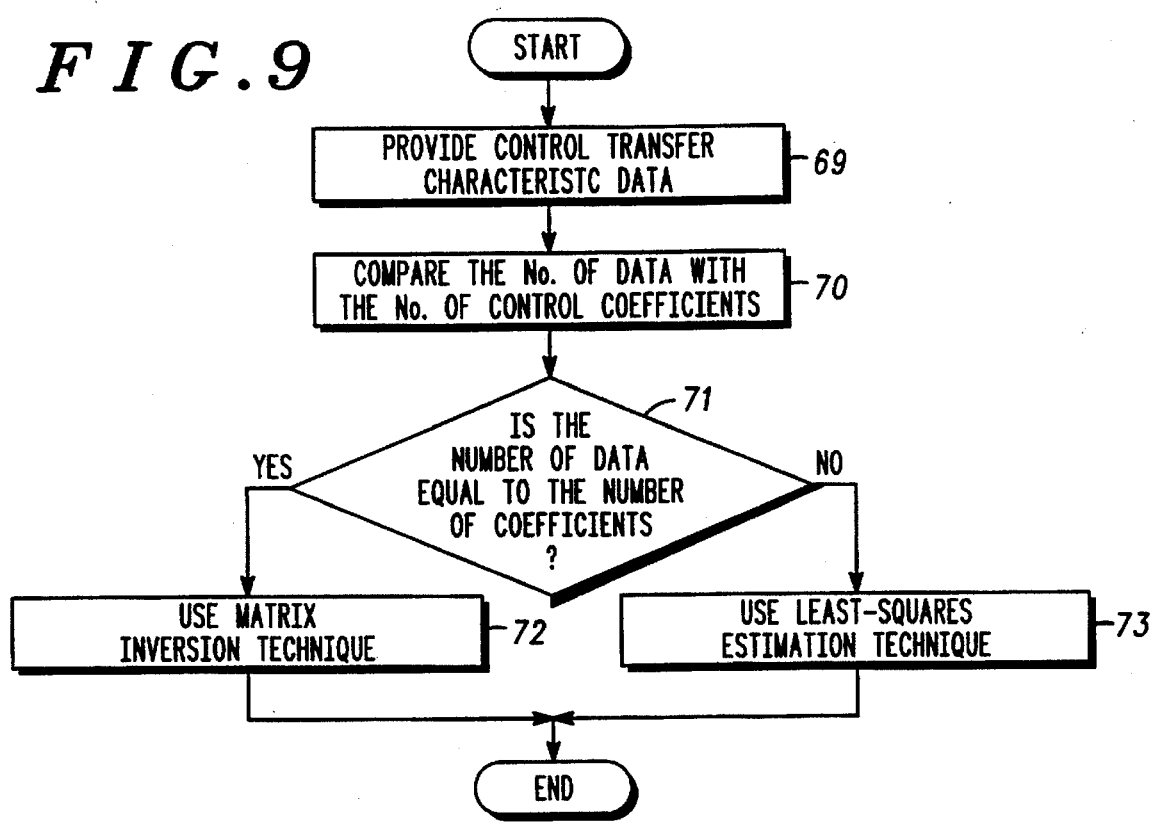
FIG. 9 shows a flow chart representation of a method of determining initial control coefficients used in one embodiment of the present invention.

FIG. 9 shows a flow chart representation of a method of determining initial control coefficients used in one embodiment of the present invention. In a preferred embodiment, the fit of the polynomial function to the control transfer characteristic data is performed in accordance with the flow chart presented in FIG. 9. First, regarding box (69), the control transfer characteristic data are provided. Next, regarding box (70), the number of data is compared with the number of control coefficients. Regarding decision box (71), if the number of data equal the number of control coefficients, the procedure goes to box (72) which indicates that a matrix inversion technique is used to solve for the initial value of each coefficient. If, on the other hand, the number of data is not equal to the number of control coefficients, the procedure goes to box (73), which indicates that a least squares estimation technique is used to solve for the initial value of each coefficient.

While a preferred embodiment is described herein, one with ordinary skill-in-the-art will recognize that other suitable estimation techniques, for example, extended least squares, pseudo inverse, Kalman filtering techniques, maximum likelihood techniques, Bayesian estimation, polynomial splines, and alike, could likewise be used to fit the control polynomial to the control transfer characteristic data.

Referring back to FIG. 7, the computation of the output error signal described in box (62) can be accomplished in several ways. In a preferred embodiment, the absolute difference between the system output and the desired output is accumulated over time to generate an objective function which rates the performance of a given set of control coefficients. On the other hand, other techniques for deriving this objective function could be used. For instance, sum squared error could be used to replace the absolute error in this calculation. Further, features of the output response could be extracted such as rise time, steady state error, percent overshoot, etc., could be used in some fashion to derive a rating or score for the performance of a given set of control coefficients and thus be used to generate an output error signal.

Figure 10:
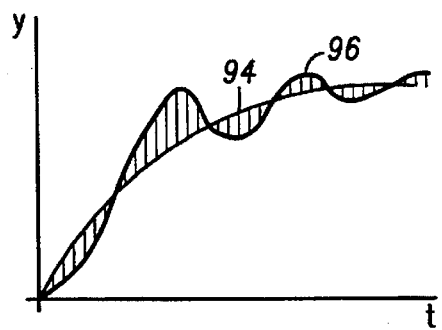
FIG. 10 shows a sample accumulation of error between the desired and control system outputs used in one embodiment of the present invention.

FIG. 10 shows a sample accumulation of error between the desired and control system outputs used in one embodiment of the present invention. Actual system output (96) is compared with desired output (94) at discrete increments of time. These absolute errors are accumulated over a sample response to generate the output error signal.

Referring back to FIG. 7, the tuning of the control coefficient values using descent-based optimization presented in box (64) can also be accomplished in several ways. Descent-based local optimization methods such as gradient methods, conjugate gradient methods, downhill simplex methods, variable metric methods, direction set methods, and the like, could all be used to converge upon a set of control coefficients which minimize the output error signal. Further, a descent-based global optimization method such as simulated annealing could also be used to calculate the best value for these control coefficients based upon the calculated initial value.

The selection of the initial value for the control coefficients is important to the operation of the descent-based optimization method. The provision of a relatively good initial value, that is, an initial value which provides an output error signal which is close to the minimum output error signal, allows the method to converge rapidly and accurately to this minimum solution. An example of the effect of this tuning of the control parameters on the control input/output characteristic is shown in FIG. 11.

Figure 11:
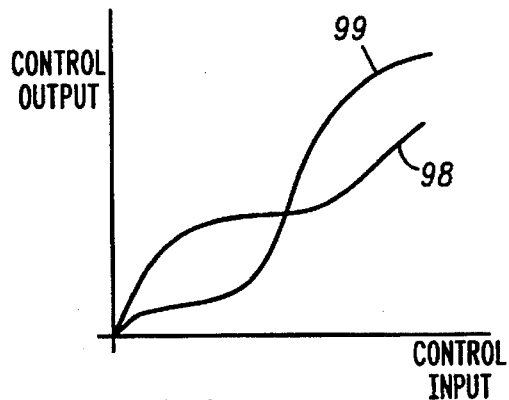
FIG. 11 shows a sample relationship between an initial control characteristic and an ideal characteristic.

FIG. 11 shows a sample relationship between an initial control characteristic and an ideal characteristic. Input/output characteristic (99) represents an initial value calculated from fitting the polynomial function to an example set of control transfer characteristic data. As the control coefficients are tuned, the shape of the input/output characteristic curve changes, yielding a final output curve (98) which may differ somewhat significantly from the initial input/output characteristic (99).

It should be noted that the polynomial controller of the present invention could be implemented by a structure described in the Related Invention referenced above.

Figure 12:
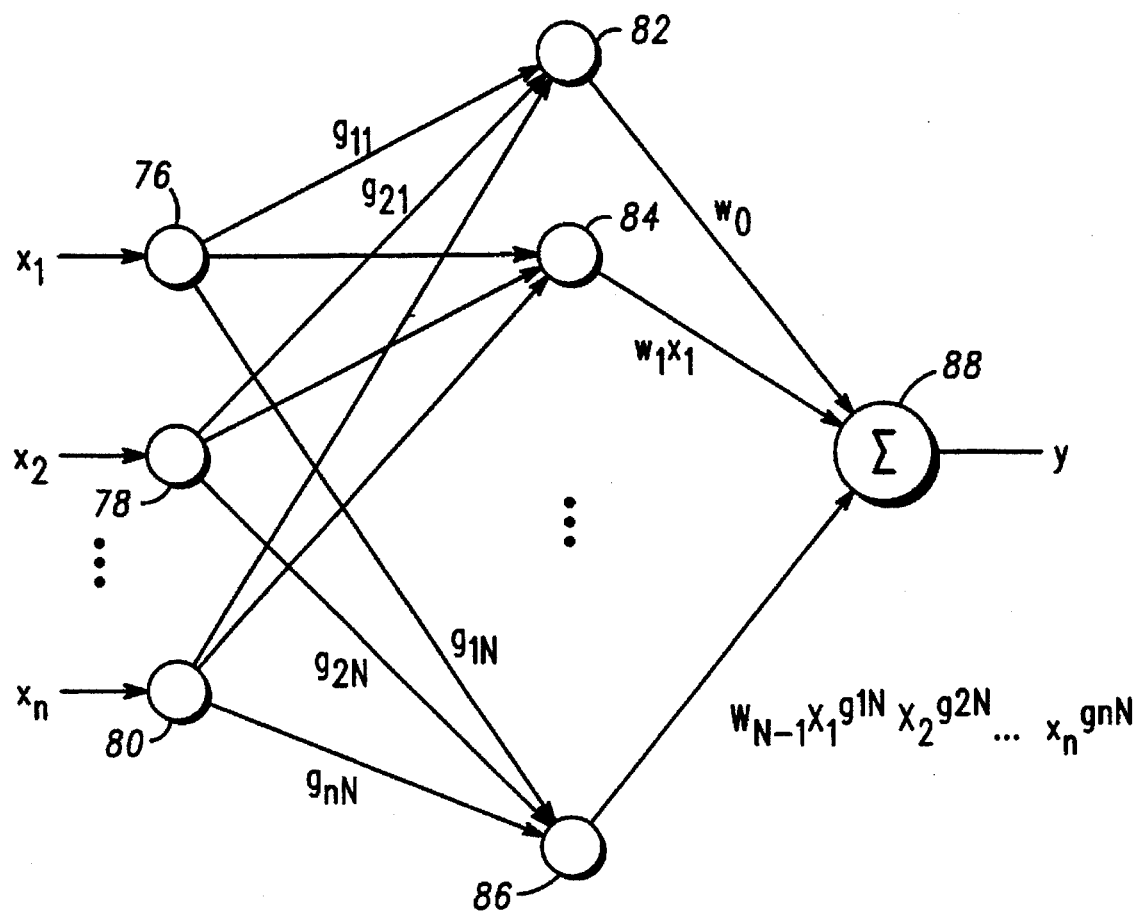
FIG. 12 shows a schematic representation of the polynomial controller used in one embodiment of the present invention.

FIG. 12 shows a schematic representation of the polynomial controller used in one embodiment of the present invention. A plurality of control inputs, $x_1, x_2, \ldots x_n$ are fed to input nodes (76, 78, . . . 80) of an input layer. The output of each input node (76, 78, . . . 80) in the input layer is distributed at least one processing element of a hidden layer (of which only processing elements (82, 84, 86 are shown). Each processing element applies a gating function to each of the control inputs to produce a corresponding gated input. Any given processing element may apply a different gating function to each different control input it receives. For example, processing element (82) applies a gating function (g11) to the control input it receives from input node (76); it applies a gating function (g21) to the control input it receives from input node (78); and so forth. The gated inputs are multiplied together by a multiplier in the processing element to form a product, which is then multiplied by a predetermined weight value to produce the control output.

For example, in FIG. 12 processing element (82), which happens to be responsible for generating the $w_o$ term or the first control coefficient, multiplies its gated inputs together to form a product (which happens to be one because in this case the gating functions $g_{11}, g_{21}, \ldots g_{n1}$ are all 0), which is multiplied by a weight $w_o$ to produce a corresponding output $w_o$. Processing element (56) which happens to be responsible for generating the $w_1 x_1$ term of the control output, multiplies its gated inputs together to form a product (which happens to be $x_1$ because in this case the gated functions are all 0 except for the gating function that is applied to the $x_1$ output of the input node (76)), which is multiplied by a weight $w_1$ to produce a corresponding output $x_1 w_1$. In like fashion, processing element (86) produces an output $w_{n-1} x_1$ to the power of $g_{1n} x_2$ to the power of $g_{2n} \ldots x_n$ to the power of $g_{nN}$. The outputs of processing elements (82, 84, . . . 86) are summed together by a suitable summing means or function, such as summer (88), in an output layer to produce the output y of the polynomial controller as follows:

$$y = \sum_{i=1}^{m} w_{i-1} x_1^{g1i} x_2^{g2i} \ldots x_n^{gni} \quad \text{Equation (3)}$$

where m is an integer which represents the number of terms in the polynomial.

Figure 13:
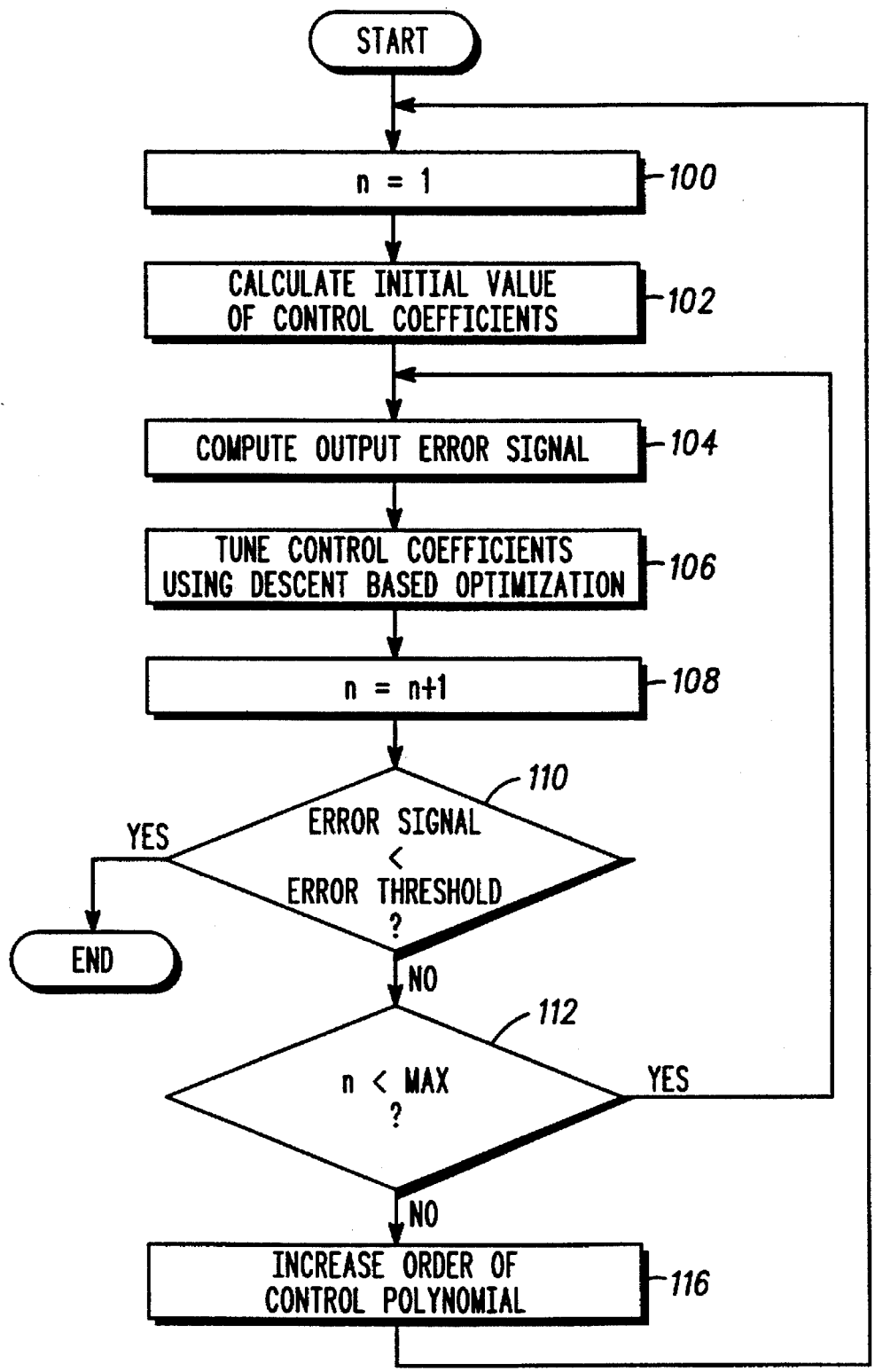
FIG. 13 shows a flow chart representation of an alternative embodiment of the method of the present invention.

FIG. 13 shows a flow chart representation of an alternative embodiment of the method of the present invention. First, regarding box (100), a loop variable n is initialized to 1. Next, the initial value of each of the control coefficients is calculated by fitting the polynomial control function to control transfer characteristic data as illustrated in box (102). The output error signal is then computed as illustrated in box (104) and the control coefficient values are tuned using a descent-based optimization method as illustrated in box (106). Loop variable n is then incremented as illustrated in box (108). Next, the error signal is compared with an error threshold, as shown in decision box (110). If the error is less than the threshold, the tuning ends. If, however, the error is not less than the threshold, the method proceeds to box (112).

Decision (112) serves to continue the execution of descent-based optimization to tune the control coefficients based upon a computed output error signal as shown in boxes (106) and (104) until the loop variable n reaches a predetermined value (max). Once (max) iterations have been performed, the method proceeds to box (116), and the order of the control polynomial is increased.

Increasing the order of the control polynomial adds at least one additional term to the polynomial and therefore adds at least one additional control coefficient. In this embodiment of the present invention, the method proceeds to block (100) where the loop variable is reset to one and new initial values of the control coefficients are calculated by fitting the new polynomial function with the increased order to the control transfer characteristic data.

The method then proceeds as before by tuning the control coefficients using the descent-based optimization method in hopes of achieving an output error signal which is less than the error threshold. It should be noted that the order of the control polynomial will be repetitively increased until the output error signal finally falls below the error threshold. A similar embodiment of the present invention is shown in FIG. 14.

Figure 14:
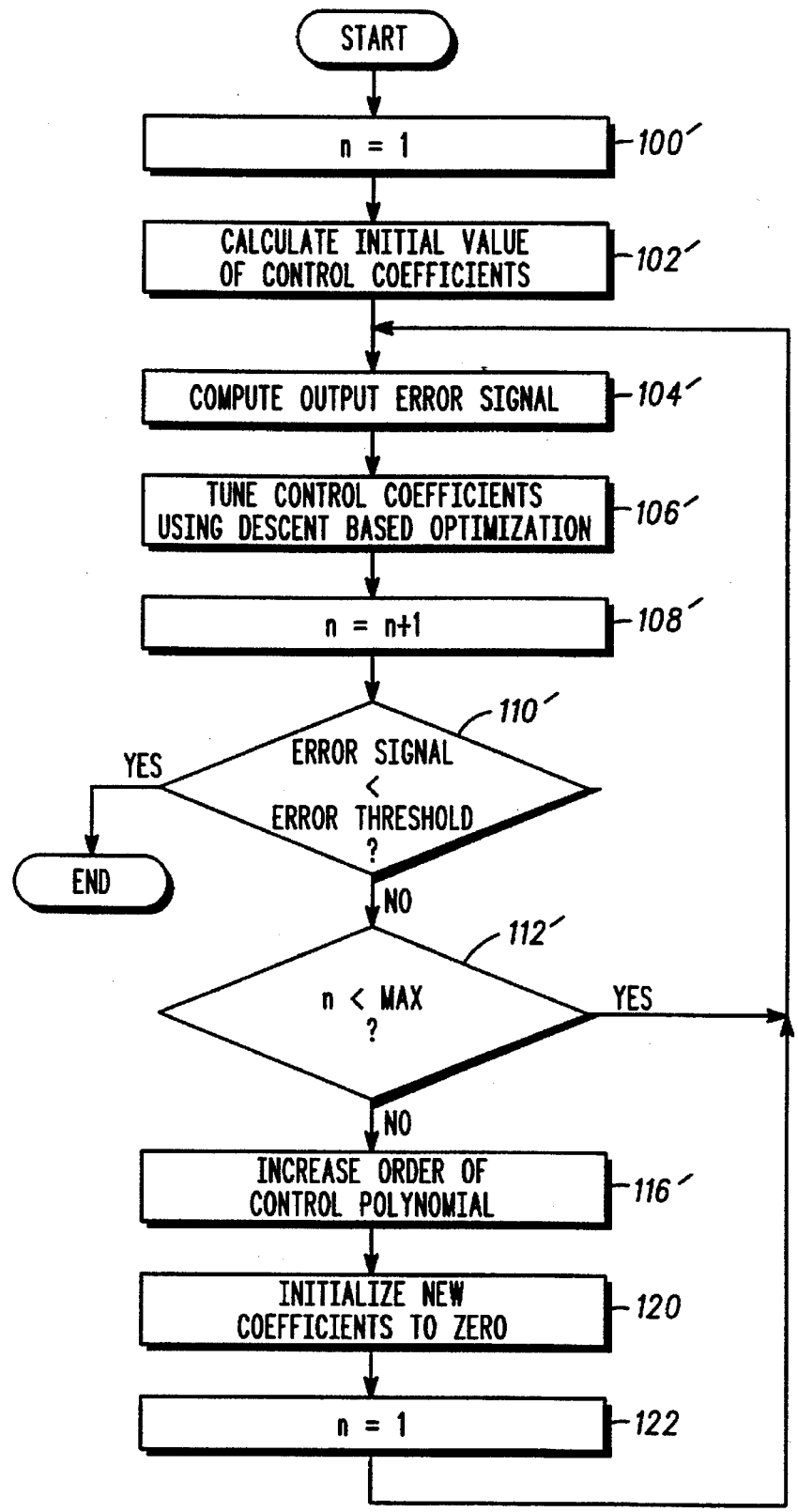
FIG. 14 shows a flow chart representation of a further embodiment of the method of the present invention.

FIG. 14 shows a flow chart representation of a further embodiment of the method of the present invention. Boxes (100)–(116) of FIG. 13 correspond to boxes (100')–(116') in FIG. 14. The difference between these two embodiments is that if the order of the control polynomial is increased, as illustrated in box (116'), the previously tuned values of the control coefficients are retained, and the new control coefficient or coefficients created by increasing the order of the control polynomial are initialized to zero as illustrated in box (120). The loop variable is then set to one as shown in box (122), and the subsequent iterative tuning of the control coefficients as illustrated in box (106') is performed based upon a new initial value which constitutes zero for the new coefficients and the previously tuned values for the other control coefficients.

Figure 15:
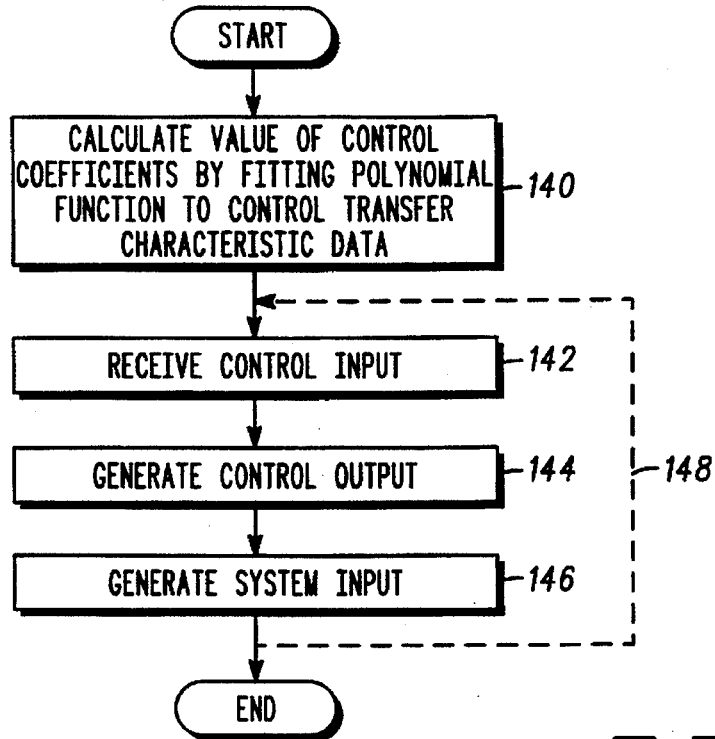
FIG. 15 presents a flow chart representation of an additional embodiment of the method of the present invention.

FIG. 15 presents a flow chart representation of an additional embodiment of the method of the present invention. This embodiment recognizes that the polynomial controller used in conjunction with the present invention could be designed by calculating a value of the control coefficients by fitting the polynomial control function to control transfer characteristic data. In certain applications, this method for calculating the value of the control coefficients could yield sufficient results without the need of additional tuning. Thus, a control characteristic derive by traditional control methods could be adapted for use with a polynomial controller by the polynomial fitting techniques previously described. First, the value of the control coefficients is calculated by fitting the polynomial function to control transfer characteristic data as illustrated in box (140). Thereafter, a control input is received as shown in box (142), a control output is generated as shown in box (144) by evaluating the fitted polynomial function, and the input to the system to be controlled is generated based upon this control output as illustrated in box (146). Feedback path (148) in FIG. 15 represents the option that this control methodology be continuously repeated.

Figure 16:
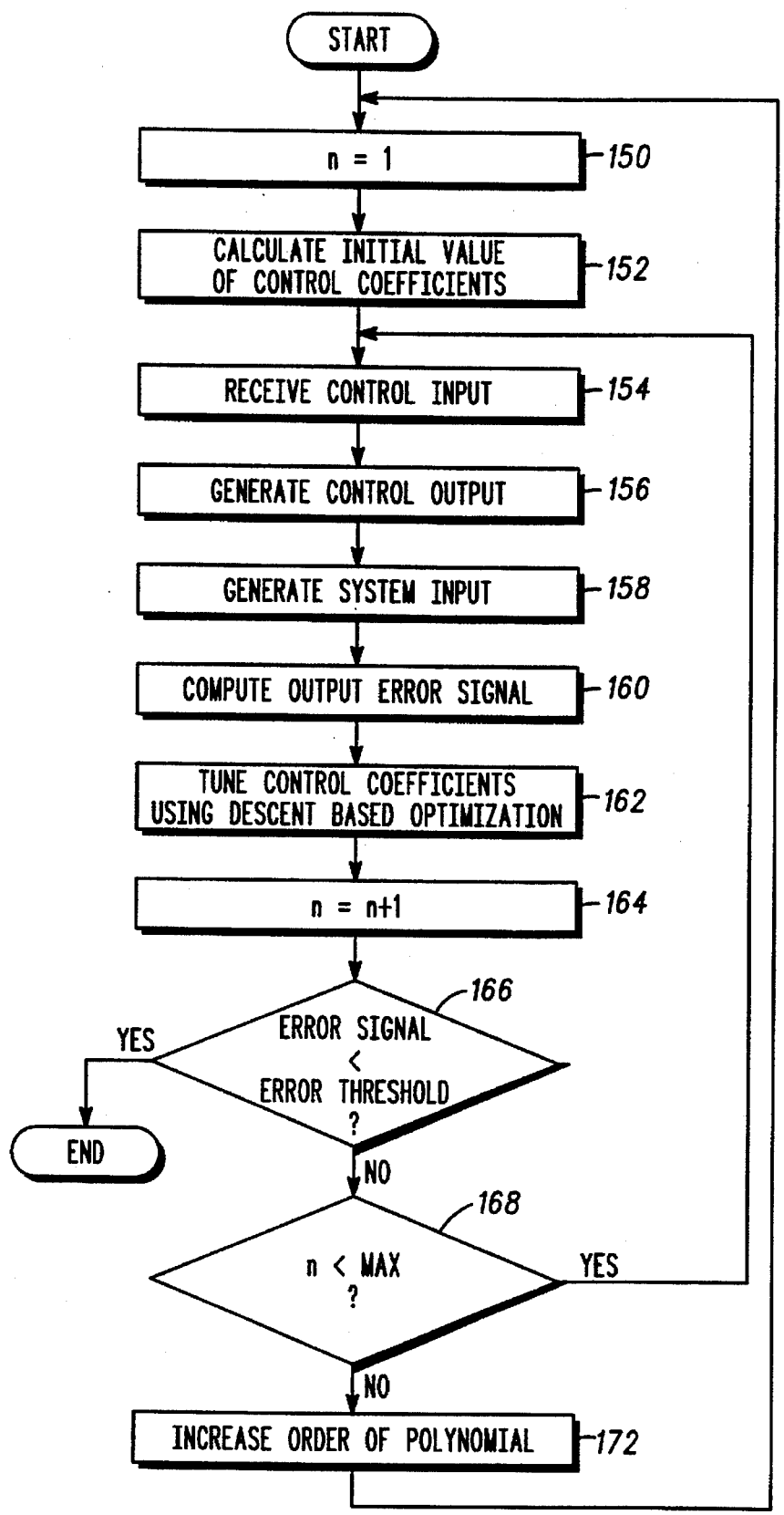
FIG. 16 presents a flow chart representation of yet another embodiment of the method of the present invention.

FIG. 16 presents a flow chart representation of yet another embodiment of the method of the present invention. This embodiment is based upon the embodiment of FIG. 15. In this case, the control coefficients are tuned using descent-based optimization methods. The method starts by initializing a loop variable n to a value of one as shown in box (150). Next, the initial values of the control coefficients are calculated by fitting the polynomial control function to control transfer characteristic data. The controller operates by receiving a control input as illustrated in box (154), generating a control output as a polynomial function of the control input as illustrated in box (156), and generating the system input based upon the control output as illustrated by box (158). The error signal is then computed as illustrated in box (160), and the control coefficients are tuned using a descent-based optimization method as shown in box (162). The loop variable n is then incremented as shown in box (164), and control and tuning steps (154), (156), (158), (160), and (162) are then repeated, as long as the error signal is less than the error threshold (as governed by box (166), until the loop variable attains a value max as governed by decision box (168).

If the error signal falls below the threshold, the tuning ends. Otherwise, when (max) iterations have been performed, the order of the polynomial is increased as shown in box (172), the loop variable n is reset to 1 as shown in box (150) and the new polynomial function is fit to the control transfer characteristic data to calculate new initial values of the control coefficients. Tuning of these new initial control coefficients is then performed iteratively until the error signal is less than a threshold, with the order of the polynomial being repetitively increased if the error signal still exceeds the error threshold after max iterations.

FIG. 17 shows an alternative embodiment of the method of the present invention. In this embodiment, boxes (150') through (172') correspond to boxes (150) through (172) of FIG. 16, the difference in the embodiment of FIG. 17 being that if the order of the polynomials increased, adding at least one additional term and a corresponding coefficient, the new coefficients of the polynomial are initialized to zero as shown in box (180) and tuning of the control coefficients using descent-based optimization as shown in box (162') is performed based upon the previous tuned value of the old control coefficients and zero for the new control coefficients.

Figure 18:
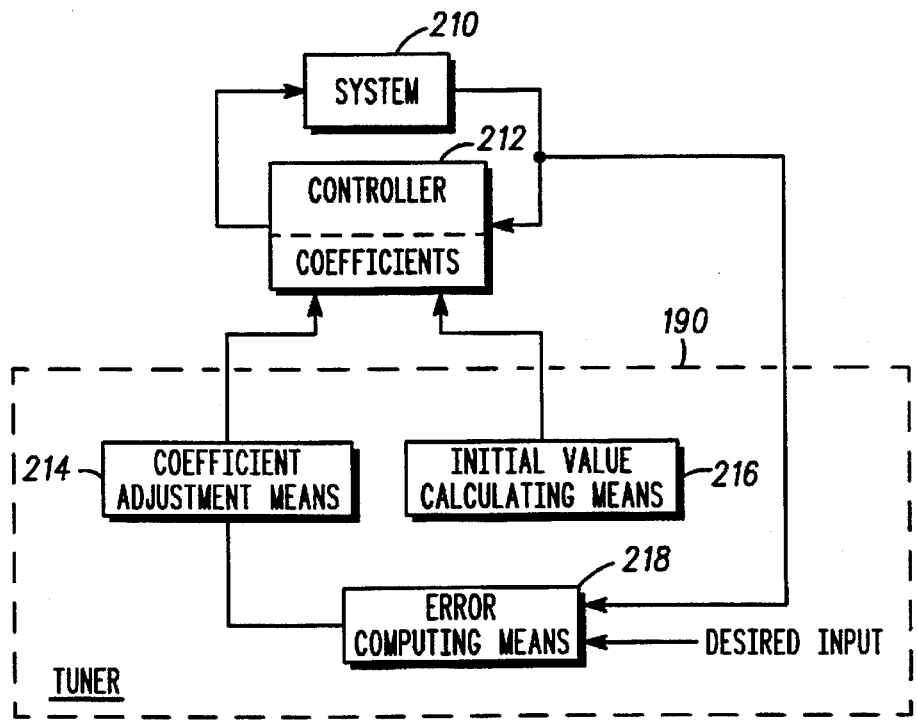
FIG. 18 shows a block diagram representation of the controller of one embodiment of the present invention.

FIG. 18 shows a block diagram representation of the controller of one embodiment of the present invention. In FIG. 18 the tuner 190 of the present invention is shown in conjunction with controller 112 whose operation is based upon a polynomial function having a plurality of control coefficients. Tuner 190 includes initial value calculating means 216 for calculating an initial value of the plurality of control coefficients by fitting the control polynomial to a plurality of control transfer characteristic data. Tuner 190 also includes error computing means 218 for computing over time an output error signal based upon the difference between the system output and a desired output. Further, tuner 190 includes coefficient adjusting means 214 for updating the value of the plurality of control coefficients using a descent-based optimization method to minimize the output error signal.

It should be understood that tuner 190 of the present invention in a preferred embodiment would be implemented using a software program operating on a processor. However, one with ordinary skill in the art will recognize that the functions described herein could further be implemented by a hardware device such as an ASIC or programmable logic array which performs the same functions that would be performed by the software program.

It will be apparent to those skilled in the art that the disclosed invention may be modified in numerous ways and may assume many embodiments other than performed form specifically set out and described above. Accordingly, it is intended by the pending claims to cover all modifications of the invention which fall within the true spirit and scope of the invention.

What is claimed is:

1. In a controller, having a control input, for controlling a system to a desired output, the controlled system having a time dependent system output, a controller operation based on a polynomial function having an order, a plurality of control coefficients and a corresponding plurality of polynomial terms, a method for tuning the control coefficients, the method comprising:
   a) calculating an initial value for each of the plurality of control coefficients by fitting the polynomial function to a plurality of control transfer characteristic data;
   b) computing, over time, an output error signal based on the difference between the system output and the desired output; and
   c) tuning the values of the plurality of control coefficients using a descent-based optimization method to control the output error signal;
   d) comparing the output error signal to an error threshold; and
   e) increasing the order of the polynomial expression if the output error signal exceeds the error threshold by adding at least one new polynomial term and a corresponding at least one new control coefficient.

2. The method of claim 1 wherein steps b) and c) are repeated at least once.

3. The method of claim 1 wherein steps b) and c) are repeated continuously.

4. The method of claim 1 wherein a system input is a vector quantity comprising a plurality of individual system inputs.

5. The method of claim 1 wherein the control input is a vector quantity comprising a plurality of individual control inputs.

6. The method of claim 1 wherein the control transfer characteristic data are generated based on at least one fuzzy logic control rule.

7. The method of claim 1 wherein the control transfer characteristic data are generated from a continuous nonlinear control transfer characteristic.

8. The method of claim 1 wherein the initial value for each of the plurality of control coefficients is calculated using a least squares method.

9. The method of claim 1 wherein the initial value for each of the plurality of control coefficients is calculated using a matrix inversion technique.

10. The method of claim 1, further comprising the step of determining an initial value for the at least one new control coefficient.

11. The method of claim 10, further comprising the step of repeating steps b) and c) after determining the initial value for the at least one new control coefficient.

12. A method for controlling a system to a desired output, the system having a time dependent system input, at least one time dependent system state, and a time dependent system output, the method based on a polynomial having an order, a plurality of control coefficients and a like plurality of polynomial terms, the method comprising:
   a) calculating an initial value for each of the plurality of control coefficients by fitting the polynomial to a plurality of control transfer characteristic data;
   b) receiving a control input based on at least one of the system output, the at least one system state, and the desired output;

c) generating a control output based on a polynomial function of the control input; and d) generating the system input based on the control output so as to drive the system output toward the desired output;

e) comparing the output error signal to an error threshold; and f) increasing the order of the polynomial expression if the output error signal exceeds the error threshold by adding at least one new polynomial term and a corresponding at least one new control coefficient.

13. The method of claim 12 further comprising the steps of:

e) computing, over time, an output error signal based on the difference between the system output and the desired output; and f) tuning the value of the control coefficients using a descent-based optimization method to minimize the output error signal.

14. The method of claim 13 wherein steps b)–f) are repeated at least once.

15. The method of claim 12 wherein steps b)–f) are repeated continuously.

16. The method of claim 12 wherein the control transfer characteristic data are generated based on at least one fuzzy logic control rule.

17. The method of claim 12 wherein the control transfer characteristic data are generated from a continuous nonlinear control transfer characteristic.

18. The method of claim 12 further comprising calculating a new initial value for the plurality of control coefficients and a value for the at least one new coefficient.

19. The method of claim 18 further comprising the step of repeating steps b)–f) for the new initial value of the control coefficients.

20. The method of claim 12 wherein the system input is a vector quantity comprising a plurality of individual system inputs.

21. The method of claim 12 wherein the control input is a vector quantity comprising a plurality of individual control inputs.

22. The method of claim 12 wherein the initial value of each of the control coefficients is calculated using a least squares method.

23. The method of claim 12 wherein the initial value of each of the control coefficients is calculated using a matrix inversion technique.

24. A controller for controlling a system to a desired output, the controlled system having a time dependent output, a controller operation based on a polynomial function having an order, a plurality of control coefficients and a like plurality of polynomial terms, the controller comprising:

means for calculating an initial value for each of the plurality of control coefficients by fitting a polynomial function to a plurality of control transfer characteristic data;

b) means for computing, over time, an output error signal based on the difference between the system output and the desired output; and c) means for updating the value of the plurality of control coefficients using a descent-based optimization method to control the output error signal; and d) means for increasing the order of the polynomial expression when the output error signal exceeds an error threshold by adding at least one new polynomial term and a corresponding at least one new control coefficient.

25. The controller of claim 24 wherein the error computing means and the coefficient adjusting means cooperate to iteratively converge on a minimum error signal.

26. The controller of claim 24 further comprising:

comparison means, operatively coupled to the error computing means, for comparing the output error signal to an error threshold;

order increasing means, operatively coupled to the controller, for increasing the order of the polynomial function if the output error signal exceeds an error threshold by adding at least one new polynomial term and a corresponding at least one new control coefficient; and means, operatively coupled to the controller, for calculating a new initial value for the plurality of control coefficients and the at least one new control coefficient.

27. The controller of claim 24 wherein the error computing means and the coefficient adjusting means cooperate to iteratively converge on a minimum error signal based on a new initial value for the plurality of control coefficients.

28. The controller of claim 24 wherein a system input is a vector quantity comprising a plurality of individual system inputs.

29. The controller of claim 24 wherein the control input is a vector quantity comprising a plurality of individual control inputs.

30. The controller of claim 24 wherein the control transfer characteristic data are generated based on at least one fuzzy logic control rule.

31. The controller of claim 24 wherein the control transfer characteristic data are generated from a continuous nonlinear control transfer characteristic.

32. The controller of claim 24 wherein the initial value for each of the control coefficients is calculated using a least squares method.

33. The controller of claim 24 wherein the initial value for each of the control coefficients is calculated using a matrix inversion technique.

* * * * *